United States Patent [19]

Duck et al.

[11] Patent Number: 4,702,549

[45] Date of Patent: Oct. 27, 1987

[54] RECIPROCATING VARIABLE OPTICAL ATTENUATOR FILTER

[76] Inventors: Gary S. Duck, 8 Thistledown Court, Nepean, Ontario, Canada, K2J 1M9; William J. Sinclair, 73 Young Road, Kanata, Ontario, Canada, K2L 1V9

[21] Appl. No.: 641,397

[22] Filed: Aug. 16, 1984

[51] Int. Cl.$^4$ .............................................. G02B 6/26
[52] U.S. Cl. ................................ 350/96.15; 350/96.20
[58] Field of Search .............. 350/96.15, 96.20, 96.21, 350/96.18

[56] References Cited

U.S. PATENT DOCUMENTS

| | | | |
|---|---|---|---|
| 3,910,677 | 10/1975 | Becker et al. | 350/96.18 |
| 4,591,231 | 5/1986 | Kaiser et al. | 350/96.20 X |

FOREIGN PATENT DOCUMENTS

| | | | |
|---|---|---|---|
| 55-45062 | 3/1980 | Japan | 350/96.15 |
| 55-73002 | 6/1980 | Japan | 350/96.15 |
| 0130505 | 10/1980 | Japan | 350/96.20 |
| 56-147106 | 11/1981 | Japan | 350/96.15 |

*Primary Examiner*—John Lee

[57] ABSTRACT

A simple variable optical attenuator or the like suitable for printed circuit board mounting has an optical filter slab positionable between the arc-rounded aligned ends of two optical fibres. The filter slab is mounted on the wiper carrying reciprocating part of an adjustable potentiometer. The resistance value corresponds to the position of the filter slab, i.e. to the attenuation or other optical index as the case may be, once the unit has been calibrated.

9 Claims, 4 Drawing Figures

RECIPROCATING VARIABLE OPTICAL ATTENUATOR FILTER

FIELD OF THE INVENTION

The present invention relates to optical attenuators in general and in particular to variable optical attenuators. More particularly it relates to a continuously variable attenuator suitable for mounting on printed circuit boards due to its small size although offering low insertion loss and good resolution.

BACKGROUND OF THE INVENTION

Now that fibre optic systems are becoming popular, in many instances replacing electronic transmission and signal processing systems, it has become necessary to facilitate the transition of system components from the laboratory to mass manufacturing.

The printed circuit board (PCB) has become over the years the primary vehicle for supporting electronic circuit components such as integrated circuits, capacitors, resistors and potentiometers. A particular class of the latter are now of particular importance, namely, the miniature trimming potentiometers popularly known as "trimpots". These permit a PCB adjustment after manufacturing by compensate for fixed component tolerances and/or to vary circuit attenuation in signal paths.

No reasonably close equivalent to the trimpot exists in optical components. While excellent variable optical attenuators (VOATs) are commercially available, with high setting accuracy, minimal reflexion and so on, they are suitable more for either the laboratory or only as a major (and expensive) component of a system. One such attenuator is made by Nippon Electric Company and having part number OD-8511. Another such VOAT is made by the present assignee and having part number VOAT 5000; it measures 10 cm×13 cm×18 cm and weighs one kilogram.

SUMMARY OF THE INVENTION

Another object of the present invention is to provide a miniature, PCB mountable VOAT, that is continuously adjustable.

A further object is to provide such a VOAT which has intregral means for ascertaining its set attenuation value by means of a simple measurement without interrupting the optical circuit.

A further object of the present invention is to provide a simple VOAT, yet one that exhibits minimal back reflection.

Furthermore, it is an object of the present invention to provide a relatively inexpensive VOAT which requires no coupling lenses.

Moreover, the VOAT of the present invention, in spite of its simplicity should be capable of remote setting.

It is a feature of the present invention that the VOAT provided may be manufactured from simple, inexpensive, commercially available optical and electronic circuit components.

The VOAT provided by the present invention features a slanted attenuation slab to minimize back reflection even without anti-reflection coating.

Another feature is that the VOAT provided employs direct fibre-to-fibre coupling without auxiliary lenses by having the fibre ends arc-rounded.

Yet another feature is that the VOAT provided may be remotely set if the requisite servo motor mechanism is provided.

The advantage of the VOAT provided are small size, reasonable cost and good resolution.

According to the present invention, a variable optical filter is provided, comprising: two optical fibres having their arc-rounded ends aligned opposite each other and separated by a predetermined gap; a thin optical filter element in said gap mounted on a reciprocating means for selectively positioning said filter element between the fibre ends along a transversal axis perpendicular to their axis of alignment; and said filter element mounted on said reciprocating means such that it is not perpendicular to said axis of alignment of the fibre ends.

Although the primary application of the invention just defined will be as a VOAT, any other optical filter characteristic may be implemented, for example to produce a variable chromatic filter, or a variable polarization filter, using the same structure but different filter elements.

BRIEF DESCRIPTION OF THE DRAWINGS

The preferred embodiment of the invention will now be described in detail in conjunction with the following drawings, in which.

DETAILED DESCRIPTION OF THE PREFERRED EMBODIMENT

Figure 1:
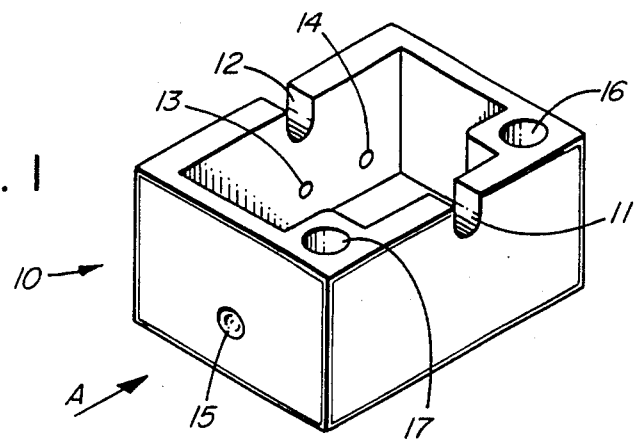
FIG. 1 is a perspective drawing of the housing of the variable optical attenuator (VOAT) of the present invntion with the cover removed.

FIG. 1 of the drawings shows an empty housing 10 with its cover (not shown) removed. With its cover in place the housing 10 measures 1.6×1.9×2.5 cm. An open U-shaped channel 11 measuring approximately 0.25×0.25 cm is formed in a wall of the housing 10, and a similar channel 12 is formed in the opposite wall. The channels 11 and 12 accommodate the input/output optical fibres and are therefore aligned. The holes 13 and 14 are formed in one of the walls to permit exit of two potentiometer terminal wires and a wider hole 15 is in the front wall to permit insertion of a screwdriver to adjust the attenuation of the assembled VOAT. The terminal wires of the potentiometer may of course be used in conjunction with a servo motor mechanism to remotely adjust the VOAT setting since, as will be seen later, the resistance value is directly related to the attenuation value. Such servo mechanisms are well known in the art and need no further elaboration. In addition, two through holes 16 and 17 are formed in the housing 10 along two corners to permit insertion of screws to fasten the assembled VOAT to a printed circuit board or the like carrier. The cover of the housing (not shown) has two matching holes and is otherwise simply a rectangular slab. The housing 10 may be made from a suitable plastic by injection molding for mass production.

Figures 2, 3:
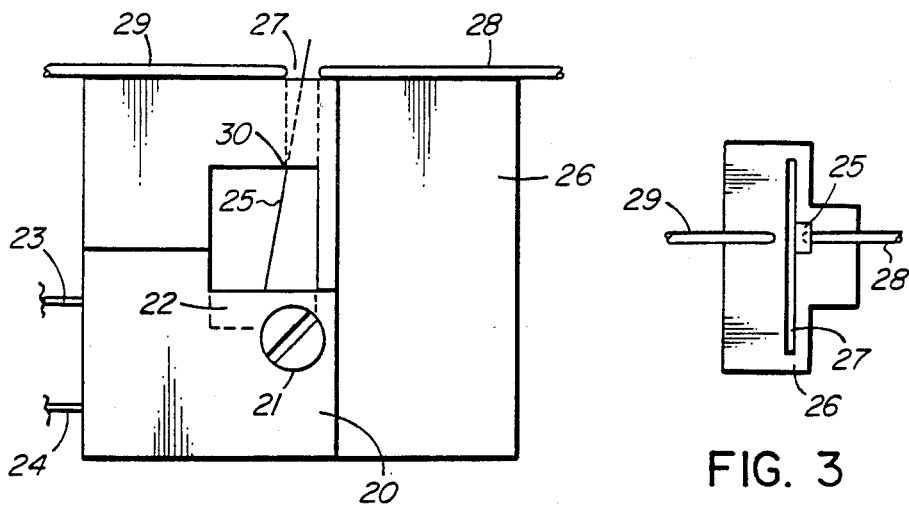
FIG. 2 is a side-elevation of the VOAT inside the housing of FIG. 1 when looking along the arrow A.
FIG. 3 is a plan view of the VOAT inside the housing of FIG. 1.

FIG. 2 of the drawings shows the assembled VOAT components as they are positioned in the housing 10 seen in direction of the arrow A in FIG. 1. A conventional potentiometer 20 of the type having a linearly travelling wiper along the thread of an adjusting screw 21, is machined to expose its wiper 22 (a suitable potentiometer is that available from Beckman, part No. 89PRIK). Two terminal wires 23 and 24 of the potentiometer 20, one (23) connected to the wiper 22 and the other (24) are sufficient to indicate the wiper 22 position expressed in resistance value. Mounted on and glued at one edge thereof to the wiper 22 is an attenuator slab 25 measuring 5×6.5 mm. The attenuator slab 25 thus attached to the wiper 22 travels along the screws 21 as it is turned and the position of the slab 25 is indicated by the resistance value between the terminals 23 and 24 and is linearly related thereto given a linear potentiometer 20. Once the attenuator slab 25 has been glued to the wiper 22 the top part 26 of the VOAT is glued to the potentiometer 20. The part 26 is shown in FIG. 3 as seen from the top of FIG. 2. The attenuator slab 25 protrudes just enough from a slit 27 to interrupt the path of light between two fibres 28 and 29, which serve as optical in/out ports of the VOAT and which have their ends arc-rounded to form focussing (and collimating) lenses without any additional or auxiliary lenses. As may be seen from FIG. 2, the slab 25 is not vertical but slightly inclined (by about 15°) and abuts only one edge 30 of the slit 27. Although in such a small and inexpensive VOAT a slanted attenuator slab could be difficult to implement, its provision in fact greatly reduces back reflection to such an extent that for many applications anti-reflection coating is not required. The manner in which the attenuator slab is mounted, however simple, makes this possible. The attenuator slab 25 is glued with rubber glue to the wiper 22 in such a way as to be urged against the edge 30. This manner of mounting lessens the detrimental effects of vibration and insures mechanical and hence optical stability. The inclination from the vertical of the attenuator slab 25 greatly lessens back reflection to better than −25 dB. The attenuator slab 25 is a commercially available attenuator filter and may be obtained from such suppliers as Metavac, Flushing, N.Y., U.S.A. or Interoptics, Ottawa, Ontario, Canada. The optical attenuation of the slab 25 varies linearly along its direction of travel between the fibres 28 and 29 (i.e. along its 5 mm edge). The choice of attenuation range determines the resolution given the 5 mm travel between fibres. Given an attenuator slab 25 having an optical density range of 0–4.0 yields a maximum attenuation range of 30 dB, while an optical density range of 0–7.0 yields a maximum attenuation range of 70 dB. The insertion loss could be as low as 0.5 dB without anti-reflection coating but typically it would be in the vicinity of 0.8 dB, depending on the quality of the attenuator filter slab 25. Using the above mentioned potentiometer 20 resolution is typically 0.5 dB but could be as low as 0.1 dB. Of course, it is possible if desired to have the attenuation of the slab 25 vary abruptly by providing it with parallel bands of uniform attenuation across each band. This would provide very accurate attenuation once the VOAT is calibrated. It is also possible to have variable chromatic filtering across a filter slab, or other filtering characteristic as may be desired.

A most suitable glass, for coating with either an attenuating coating to produce the attenuator slab 25 or for coating with other chromatic coating, is provided by Corning Glass Co. under the designation "cover glass slide OO". It is 50 to 70 micrometers thick. Such thin slabs are necessary since for best results the gap between the ends of the fibres 28 and 29 is optimal in the vicinity of 100 micrometers. The separation between the fibres 28 and 29 ends should be adjusted during the assembly procedure for minimum insertion loss before the fibres 28 and 29 are finally glued in the channels 11 and 12. Accordingly, the fibres 28 and 29 are simply glued on top of the part 26 and it is then only important to ensure that they will be in correct position to fit in the U-shaped channels 11 and 12 of the housing 10. The lateral position of the slab 25 is not critical, for once the VOAT is fully assembled it is calibrated by two simple measurements, one coinciding with the minimum attenuation and its associated resistance value and one coinciding with maximum attenuation and the associated resistance value. The resistance values themselves are of no consequence. In many applications the VOAT is simply used like the minipots in electronic circuits without the necessity of knowing what value they have been adjusted to.

Figure 4:
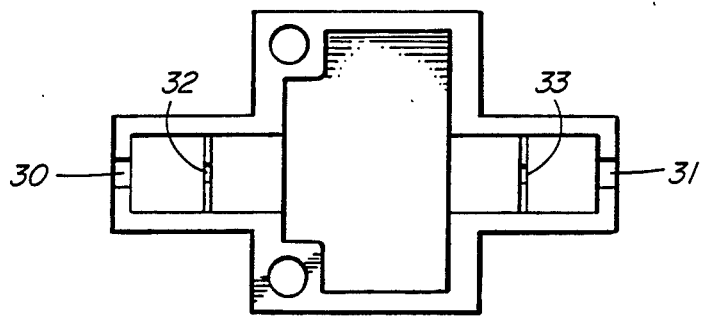
FIG. 4 is a plan view of a variation on the housing of FIG. 1 to accommodate a fibre cable.

FIG. 4 of the drawings shows in plan view a variation of the housing 10 of FIG. 1. This variation is suitable for single fibre cables, where the cable jackets are placed into two outside channels 30 and 31, while the stripped fibres are placed in two inner channels 32 and 33. The remainder of the housing is the same. Either housing is just large enough to permit placing of the assembly therein but must be high enough to clear the upper edge of the slab 25. The bottom of the potentiometer 20 is glued to the floor of the housing and the fibres in addition to being glued to the top surface of the inside assembly are glued in their respective channels. Finally, a compatible cover (not shown) is glued on.

What is claimed is:

1. A variable optical filter comprising: two optical fibres having their arc-rounded ends aligned opposite each other and separated by a predetermined gap; a thin optical filter element in said gap mounted on a reciprocating means for selectively positioning said filter element between the fibre ends along a transversal axis perpendicular to their axis of alignment; and said filter element mounted on said reciprocating means such that is is not perpendicular to said axis of alignment of the fibre ends.

2. The variable optical filter as defined in claim 1, said thin optical filter element having an optical filtering characteristic that varies along said transversal axis.

3. The variable optical filter as defined in claim 2, said optical filtering characteristic being optical transmissivity across the filter element.

4. The variable optical filter as defined in claim 3, the plane of the filter element deviating from being perpendicular to said axis of alignment by a predetermined angle.

5. The variable optical filter as defined in claim 3, said thin filter element glued at its base to said reciprocating means by a resilient glue and abutting a fixed supporting edge along a line intermediate its base and its upper most edge.

6. The variable optical filter as defined in claim 3, said reciprocating means also supporting a wiper contact of a variable resistance having its variable wiper terminal and another of its terminals accessible for sensing a resistance value therebetween corresponding to a selected position of the filter element.

7. The variable optical filter as defined in claim 3, further comprising a potentiometer having its wiper movement coordinated with movement of said reciprocating means to indicate a selected position of the filter element by a corresponding resistance value.

8. The variable optical filter as defined in claim 3, including housing means for rigidly supporting the ends of said two optical fibres in alignment oposite each other and in relation to said thin optical filter element as it is reciprocatingly adjusted between the fibre ends by means of said reciprocating means.

9. The variable optical filter as defined in claim 3, said thin optical filter element being a slab of filter glass resiliently urged against a linear rigid edge in a housing having said two fibres affixed thereto, said linear rigid edge being parallel to said transversal axis.

* * * * *